United States Patent

[11] 3,621,122

[72] Inventor William Ernest Henry Hipwell
Wickford, England
[21] Appl. No. 846,399
[22] Filed July 31, 1969
[45] Patented Nov. 16, 1971
[73] Assignee The Marconi Company Limited
London, England
[32] Priority Aug. 13, 1966
[33] Great Britain
[31] 38,701/68

[54] COLOR TELEVISION CAMERAS
21 Claims, 7 Drawing Figs.

[52] U.S. Cl. .......... 178/5.4 M, 178/5.4 TC
[51] Int. Cl. .......... H04n 51/26
[50] Field of Search .......... 178/5.4, 5.4 FC, 5.2, 5.4 M

[56] References Cited

UNITED STATES PATENTS

| | | | |
|---|---|---|---|
| 3,404,220 | 10/1968 | Favreau | 178/5.4 |
| 3,471,634 | 10/1969 | Clark et al. | 178/5.4 TC |

*Primary Examiner*—Robert L. Griffin
*Assistant Examiner*—Richard P. Lange
*Attorney*—Baldwin, Wight & Brown

ABSTRACT: In a component camera tube color television camera registration is effected by comparing changes in the output signals from one component camera tube with changes in the output of another and using the result of the comparison to correct for registration errors. The output signals from one tube may be subjected to two equal successive delays and the undelayed and doubly delayed signals each analogue multiplied by the output signals from the other tube, the results of the multiplication being compared.

Figure 1:
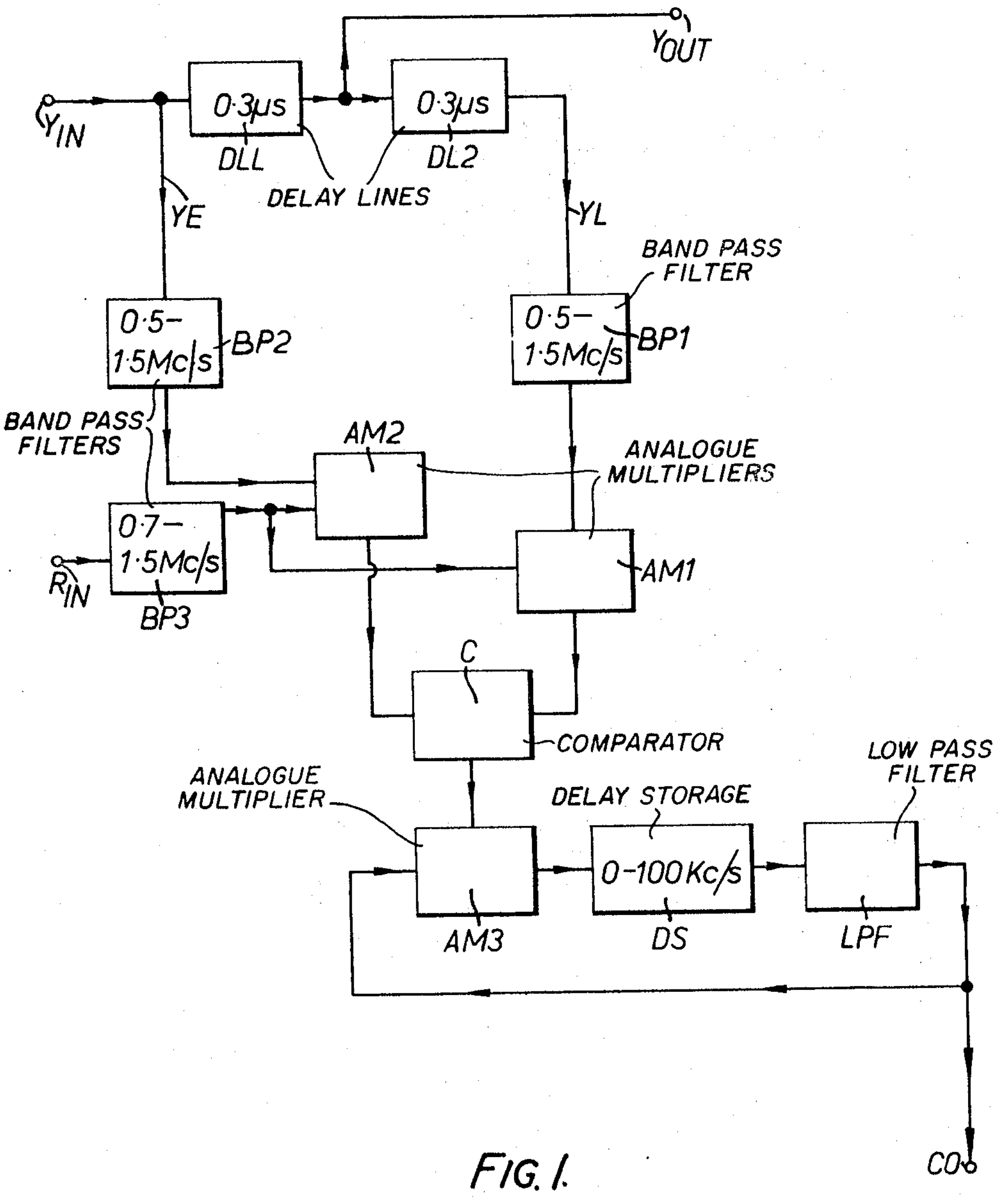

INVENTOR
William Ernest Henry Hipwell
BY
Baldwin Wight Diller & Brown
ATTORNEYS

INVENTOR
William Ernest Henry Sipwell
BY
Baldwin Wight Diller & Brown
ATTORNEYS

INVENTOR
William Ernest Henry Hipwell
BY
Baldwin Wight Diller & Brown
ATTORNEYS

INVENTOR
William Ernest Henry Hipwell
BY
Baldwin Wight Diller & Brown
ATTORNEYS

INVENTOR
William Ernest Henry Hipwell
BY
Baldwin Wight Diller & Brown
ATTORNEYS

INVENTOR
William Ernest Henry Hipwell
BY
Baldwin Wight Diller & Brown
ATTORNEYS

INVENTOR
William Ernest Henry Hipwell
BY
Baldwin Wight Diller & Brown
ATTORNEYS

COLOR TELEVISION CAMERAS

This invention relates to color television cameras and more specifically to color television cameras of the type in which a plurality of component cooperating camera cathode-ray tubes—hereinafter termed, for the sake of brevity, simply component camera tubes—are employed to scan images of a subject of transmission to derive television signals for transmission. In some color television cameras of this type there are three component camera tubes, one for each of three component colors, or a luminance tube and two color tubes. In other color television cameras of the type in question there are four component camera tubes, namely a luminance tube and three color tubes.

In any color television camera of the component camera tube type, irrespective of the number of component camera tubes employed, it is necessary for satisfactory operation that the component camera tubes shall scan in register with one another. The obtaining of satisfactory registration presents a difficult problem which it is the object of the present invention to solve by relatively simple and economical means.

Throughout this specification (including the claims thereof) the word "horizontal" is used, to refer to scanning in the line direction and the word "vertical" is similarly used to refer to the field direction component of scanning, since, in normal present day practice, the line direction is horizontal and the field direction is vertical.

According to this invention its broadest aspect registration as respects at least the horizontal direction of scanning is effected in a color television camera of the component camera tube type by comparing changes in the output signals from one component camera tube with changes in the output signals from another and utilizing the resultant of comparison to control, in dependence upon said resultant, the scanning in one of said tubes to correct for registration errors thereof with respect to the scanning in the other.

A color camera in accordance with this invention and having three or more component camera tubes may be provided with a plurality of separate comparators each connected to compare changes in the output signals from one tube with changes in the output signals from a different one of the remaining tubes so as to produce a plurality of resultants each of which is utilized to control scanning in a different one of said remaining tubes.

Alternatively a color camera in accordance with this invention and having three or more component camera tubes may be provided with a comparator having one input fed with output signals from one tube and another input which is switched to receive outputs from the remaining tubes one at a time and in turn so as to produce successively each of a plurality of resultants which are also switched successively to effect control of scanning in the different remaining tubes. Here the control is of scanning in the horizontal, i.e., the line direction, the switching is preferably effected at an integral fraction of the line frequency. In the case of a three tube color camera the switching is preferably effected at half the line frequency and the comparator has one input fed with output signals from one tube and its other input switched to receive outputs from the other two tubes one at a time and in turn. In the case of a four tube color camera the switching is preferably effected at one third of the line frequency and the comparator has one input fed with output signals from one tube and its other input switched to receive outputs from the other three tubes one at a time and in turn.

It is possible to secure registration which is sufficiently good for practical purposes in some cases by controlling horizontal scanning only so as to secure registration in the horizontal direction alone. Preferably, however, in carrying out the invention changes in the output signals from one component tube are also compared with changes in the output signals from another to produce another resultant of comparison which is utilized to control, in dependence thereon, the vertical scanning in one tube to correct for vertical registration errors thereof with respect to vertical scanning in the other.

Preferably the resultant of comparison, or each of them (as the case may be) is fed to a multiplier followed by a delay store the output of which is recirculated back to the multiplier and is also employed to provide a scanning control signal.

In a preferred way of achieving correction for horizontal registration errors as between two component tubes, output signals from one of them are subjected successively to two equal delays each approximately equal to half a coloring channel picture element; the undelayed signals the doubly delayed signals are fed respectively to two analogue multipliers the second inputs to which are constituted by the output signals from the other of said tubes; and the outputs from the two analogue multipliers are fed respectively to the two inputs of a comparator the output from which is utilized to control the horizontal scanning in said other component tube. Preferably the undelayed and doubly delayed signals are fed to their respective analogue multipliers through similar band pass filters. The output from the comparator may be fed to one input of a third analogue multiplier the output from which is fed through means including a delay-store having a delay of one line period to the second input of said third analogue multiplier, the output from said store being utilized to provide horizontal dynamic shift voltage for said other control tube. In a modification the output from the comparator is fed to one input of a third analogue multiplier the output from which is fed to an analogue-to-digital converter followed by a delay store having a delay of one line period and which is in turn followed by a digital regenerator in turn followed by a digital-to-analogue converter feeding back into the second input of said third analogue multiplier, the output from said digital-to-analogue converter being utilized to provide horizontal dynamic shift voltage for said other control tube. In another modification the output from the comparator is fed via an analogue-to-digital converter to one input of a third multiplier constituted by a digital multiplier, the output from which is fed via a delay store having a delay of one line period and which is followed by a digital regenerator, back to the second input of said digital multiplier, the output of said digital regenerator being also fed to a digital-to-analogue converter the output from which is utilized to provide horizontal dynamic shift voltage to said other tube. In a still further modification the output from the comparator is switched cyclically and in turn to a plurality of units each comprising a multiplier and a following delay store providing a delay of one line period and feeding back into the second input of the last mentioned multiplier, the outputs of the stores in the different units being switched in synchronism with the aforesaid switching, cyclically and in turn to a circuit from which horizontal dynamic shift voltage is taken to said other tube, the switching being such that one complete cycle thereof is effected in one field period.

In a preferred way of achieving correction for vertical registration errors, output signals from one component tube are subjected successively to two equal delays each substantially equal to one line; the undelayed and singly delayed signals are fed as the two inputs of a first auxiliary comparator; the singly delayed and doubly delayed signals are fed as the two inputs to a second auxiliary comparator; the outputs of the two auxiliary comparators are fed respectively to two analogue multipliers the second inputs to which are constituted by the output signals from the other of said tubes; and the outputs from the two analogue multipliers are fed respectively to the two inputs of a main comparator the output from which is utilized to control the vertical scanning in said other tube. The output from the main comparator may be fed to one input of a third analogue multiplier the output from which is fed through means including a delay-store having a delay of one field period to the second input of said third analogue multiplier. In a modification the output from the main comparator is fed to one input of a third analogue multiplier the output from which is fed to an analogue-to-digital converter followed by a delay store having a delay of one field period and which is in turn followed by a digital regenerator in turn followed by a digital-to-analogue converter feeding back into the second input of said third analogue multiplier, the output from said digital-to-analogue converter being utilized to provide vertical dynamic shift voltage for said other control tube. In another modification the output from the main comparator is fed via an analogue-to-digital converter to one input of a third multiplier constituted by a digital multiplier, the output from which is fed via a delay store having a delay of one field period and which is followed by a digital regenerator, back to the second input of said digital multiplier, the output of said digital regenerator being also fed to a digital-to-analogue converter the output from which is utilized to provide vertical dynamic shift voltage to said other tube. In a still further modification the output from the main comparator is switched cyclically and in turn to a plurality of units each comprising a multiplier and a following delay store providing a delay of one field period and feeding back into the second input of the last-mentioned multiplier, the outputs of the stores in the different units being switched in synchronism with the aforesaid switching, cyclically and in turn to a circuit from which vertical dynamic shift voltage is taken to said other tube, the switching being such that one complete cycle thereof is effected in one line period.

If desired switch means, operable at will, are inserted in the output circuit or circuits of the comparator or comparators (as the case may be) comparing output signals from two different component camera tubes whereby said circuit or circuits may be at will held open or closed.

The invention is illustrated in the accompanying drawings which show diagrammatically and so far as is necessary to an understanding of the embodiments to which they relate, a plurality of embodiments of the invention.

FIG. 1 is a block diagram illustrating one way of applying the invention to secure horizontal registration. In FIG. 1 it is assumed that the camera is of the four tube type having a luminance tube and three color tubes, though, as will be apparent, the invention is equally applicable to three-tube cameras. In order to simplify FIG. 1 only the circuitry provided in order to secure registration in the horizontal direction of the red color tube is shown, it being understood that the registration of the other color tubes is obtained in similar manner.

Referring to FIG. 1, output signals $Y_E$ from the luminance tube (not shown) are fed in to the terminal $Y_{IN}$ and output signals from the red color tube (also not shown) are fed in to the terminal $R_{IN}$. The signals from $Y_{IN}$ are fed through a first delay circuit DL1 providing a delay of the order of half a coloring channel picture element—for example a delay of 0.3 μsec., to quote a practical figure—to the main output terminal $Y_{OUT}$ whence the luminance signals are taken and processed in the normal manner.

Following the delay line DL1 is a similar delay line DL2, the output from which will consist of delayed luminance signals $Y_L$ delayed by 0.3 μsec. with reference to the signals at $Y_{OUT}$ and by 0.6 μsec. with reference to the signals at $Y_{IN}$. These doubly delayed signals are fed via a band-pass filter BP1 adapted to pass frequencies corresponding to the upper end of the spectrum of the coloring signals—for example a band of 0.5–1.5 c./sec.—to one input of an analogue multiplier AM1.

The signals $Y_E$ are also fed through a second band pass filter BP2, identical with the filter BP1, to one input of a second analogue multiplier AM2. The second input to each of the two multipliers AM1 and AM2 is obtained from the input terminal $R_{IN}$. These second inputs to AM1 and AM2 may be fed thereto directly from the terminal $R_{IN}$ but, as shown, they are preferably fed thereto through a third band-pass filter BP3, generally similar to the filters BP1 and BP2 (it is indicated in FIG. 1 as having a pass band of 0.7–1.5 c./sec.) the purpose of which is to reduce second order effects due to unwanted noise components. In practice, of course, the various filters will introduce delays for which compensation must be provided in accordance with known practice but, in describing FIG. 1, these delays are, for simplicity, ignored and no delay compensating means are shown.

The multipliers AM1 and AM2 may conveniently be of the known kind utilizing Hall effect but other known multipliers capable of operation in all four quadrants may be employed.

The outputs of the two multipliers AM1 and AM2 are fed as the two inputs to a comparator C constituted, for example, by a differential amplifier. This comparator, which may be of any known form adapted to provide zero output when the two inputs thereto are equal, provides one input to a further analogue multiplier AM3. This multiplier is arranged in known manner so that, in the absence of output from C, its multiplication factor is unity, but, when the comparator C is unbalanced (i.e. when its output is not zero) the multiplication factor of AM3 is increased or decreased (in dependence on the direction of unbalance) but is, however, always positive.

The output from AM3 is fed into a delay line storage system DS having a delay equal to one line period (for example, as indicated a delay of 64 μsec. ) and a pass band of, say, 0–100 c./sec. The delayed output from DS is fed back as the second input to the multiplier AM3 either directly or, as shown, through a low pass filter LPF. For this second input also, the multiplier AM3 has a multiplication factor of unity when there is zero output from DS i.e. in the "idling" condition. The output from DS is also taken off at the terminal CO and utilized in any convenient manner (not illustrated in FIG. 1) to provide dynamic correcting shift of the horizontal scanning waveform used to effect line scanning in the red color tube. In this way any departure from balance in the comparator C, due to misregistration (as regards horizontal scanning) in the luminance and red color tubes, will produce a correction to the horizontal scanning in the red color tube causing the output from C to be returned to zero. Horizontal registration is thus obtained.

To consider the operation of FIG. 1 more in detail suppose the subject of transmission to contain a vertical edge separating a white area from a black one (or vice versa) which, if the luminance tube and the red color tube are in registration as respects horizontal scanning, will produce simultaneous transients in the signals appearing at $Y_{IN}$ and $R_{IN}$. In this circumstance (correct horizontal registration) the signals $Y_E$ and $Y_L$ will be equally spaced in time on opposite sides of the signal at $R_{IN}$ (and also at $Y_{OUT}$); the outputs of the multipliers AM1 and AM2 will be equal; the comparator C will be in balanced condition; and the multiplier AM3 will permit the signal from the store DS to recirculate unmodified, with unity multiplication. If, however, there is misregistration horizontally so that the transient at $R_{IN}$ is not midway in time between the corresponding transients in the signals $Y_E$ and $Y_L$, there will be an output from the comparator C and the recirculating signal in the store DS will be correspondingly modified. The signal at CO, which will be a waveform of line periodicity and dependent on the horizontal misregistration occurring, is used as a source of dynamic horizontal shift voltage to correct this misregistration. In this way a waveform will be gradually synthesized in the store DS as repeated horizontal scans modify the stored waveform and will minimize errors of horizontal registration throughout the images scanned. In the absence of picture detail in parts of the images scanned, the correcting waveform will be "remembered" unchanged.

In practice registration errors are likely to change smoothly across the images in the horizontal direction and it is therefore of practical advantage to limit the bandwidth of the storage delay system to a few times—say 5 to 10 times—the line frequency. It is for this reason that in FIG. 1 the band pass of DS is set at 0–100 c./sec. Such limitation integrates out minor disturbances to a considerable degree and has the practical advantage of enabling a considerably cheaper device to be used for DS than would otherwise be possible.

An arrangement similar to that illustrated by FIG. 1 is used to provide correction of horizontal scanning in the other color component tubes. In each case the luminance signals are fed in at a terminal corresponding to the terminal $Y_{IN}$ in FIG. 1 and the signals from the color tube in question is fed in at a terminal corresponding to $R_{IN}$ in FIG. 1.

Figure 2:
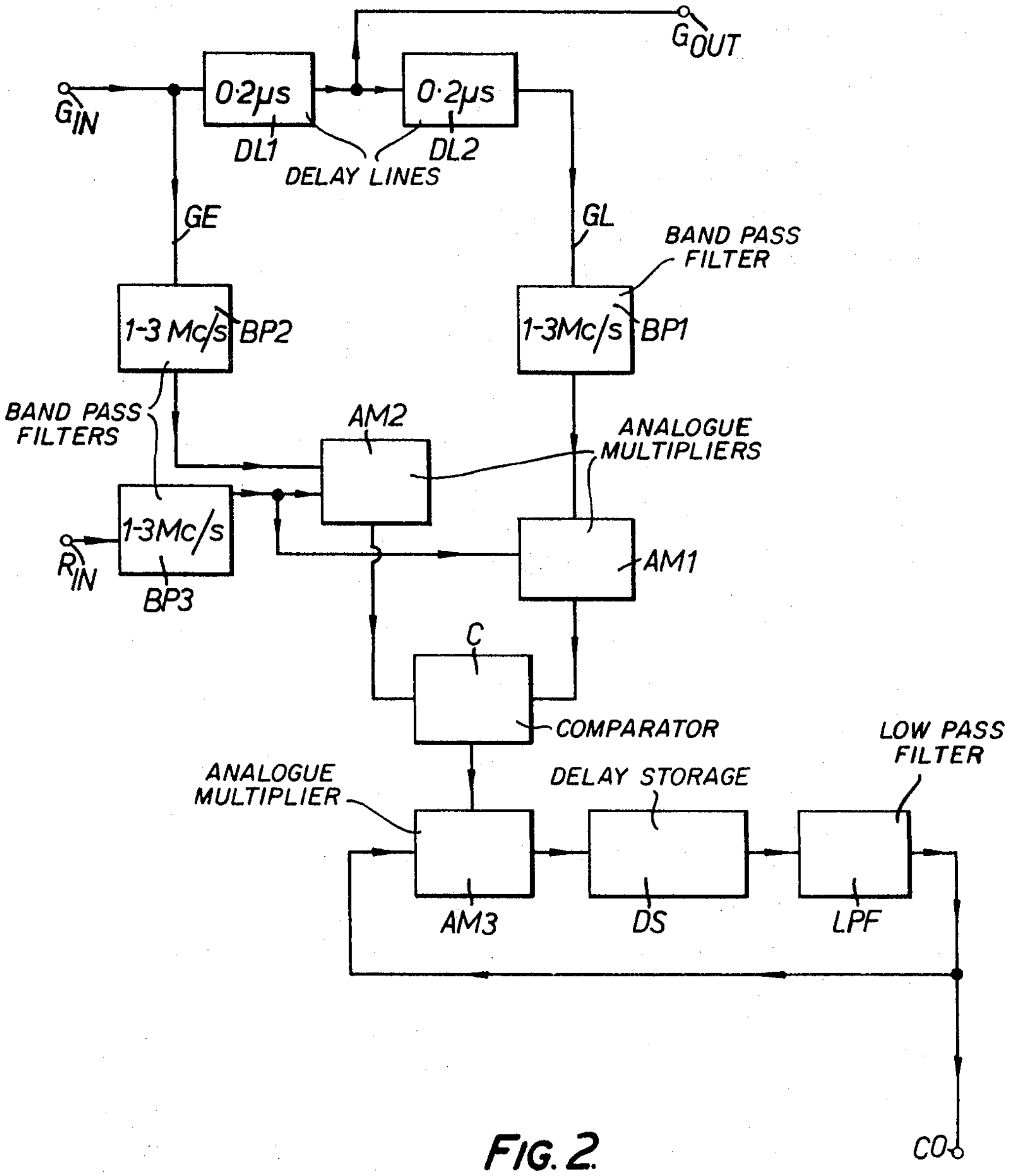

FIG. 2 shows, in the same manner as FIG. 1, the invention applied to secure registration in a camera with three color tubes but no separate luminance tube, luminance signals being derived in well-known manner by combination of signals from the three color tubes in the correct proportions. Since there is no luminance tube to act as a reference tube (as in FIG. 1) for the registration scanning control, one of the color tubes—as represented in FIG. 2 the green color tube—is used as the reference.

Referring to FIG. 2 signals GE from the green tube (not shown) are fed in at $G_{IN}$ and taken off for utilization in the normal way from the output terminal $G_{OUT}$ after being delayed—as shown in FIG. 2 by 0.2 sec.—by the delay line DL1. Except for the substitution of the green signals $G_E$ and GL FIG. 2 for the luminance signals YE and $Y_L$ respectively in FIG. 1, the circuit of FIG. 2 is like that of FIG. 1 and corresponding parts in the two figures are given corresponding references. In FIG. 2 the delay devices DL1 and DL2 have delays of 0.2 $\mu$sec. each, and the band pass filters BP1, BP2 and BP3 each has a pass band of 1 −3 c./sec. In normal practice the bandwidths of the different color signal channels from the different color tubes (not shown) will be equal at about 5 c./sec. and accordingly advantage can be taken of this to use somewhat broader band filters for BP1, BP2 and BP3 than in FIG. 1—as stated filters with pass bands of 1 −3 c./sec. are used in FIG. 2—and to shorten somewhat the delays of the delay devices DL1 and DL2 from the 0.3 $\mu$ sec. delays in FIG. 1 to the 0.2 $\mu$sec. delays of FIG. 2.

Figure 3:
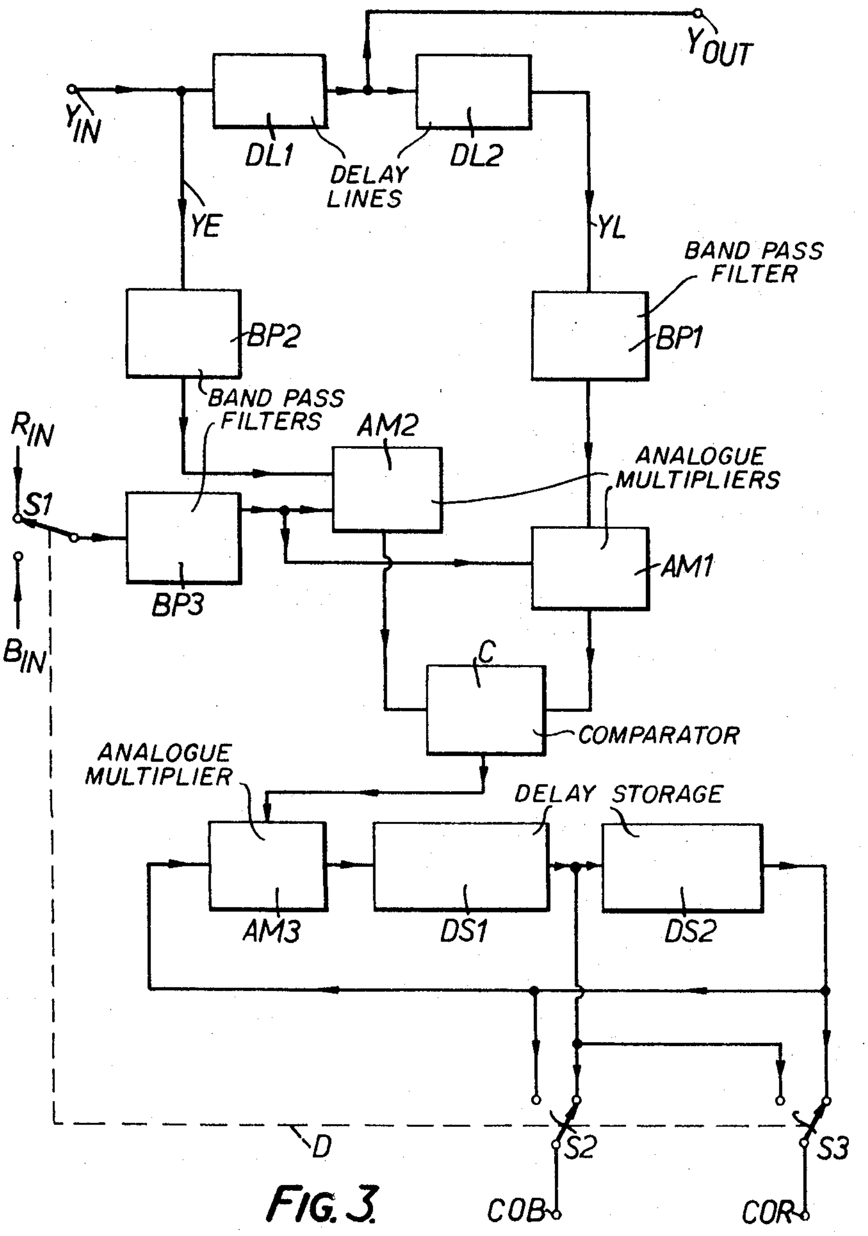

With a four-tube camera with registration effected as described with reference to FIG. 1, there will be three circuits as in FIG. 1 for securing registration of the red, green and blue tubes respectively with the luminance tube which acts as the reference tube. Similarly, with a three-tube camera with registration effected as described with reference to FIG. 2, there will be two circuits as in FIG. 2 for securing registration of the two of the tubes respectively with the third. This obviously involves a considerable amount of circuitry and apparatus. The quantity of apparatus required can, however, be considerably reduced by resorting to time sharing to enable the same circuit units to be used for securing registration of more than one tube with the reference tube. FIG. 3 shows an embodiment in which the time sharing principle is employed for securing registration in a three -tube camera of the Y, R, B (luminance red and blue tube) type, green being obtained by a subtraction method as well known per se. The red and blue tubes are held in registration using the Y tube as the reference. Apart from the addition of time sharing and the use of the $Y_E$ and $Y_L$ signals instead of the GE and GL signals, the operation of FIG. 3 is like that of FIG. 2 and corresponding parts in FIGS. 1, 2 and 3 have the same references.

In FIG. 3 there are three ganged two-position switches $S_1$, $S_2$ and $S_3$ which may be of any known convenient nature, electronic or electromagnetic, and which are changed over together from one position to the other by any means (not shown) at half the line frequency. In FIG. 3 the switch drive is represented by the broken line D. There are two horizontal dynamic shift outputs, one taken off from switch $S_2$ at terminal COB for correcting horizontal scanning in the blue tube and the other, taken off from switch $S_3$ at terminal COR, for correcting horizontal scanning in the red tube. In the position shown switch $S_1$ feeds in signals from the red tube (at $R_{IN}$) to the multipliers Am1 and AM2,—as shown through the optionally provided filter BP3. In its other position signals from the blue tube (at $B_{IN}$) are similarly fed in. The single delay-store DS of FIGS. 1 and 2 is replaced in FIG. 3 by two such delay stores DS1 and DS2, each giving a delay of one line. $S_2$ is fed from the output of DS1 and $S_3$ is fed from the output of DS2. As will be apparent horizontal registration correction of each of the two controlled tubes (the red and blue) will only occur on alternate lines so that, compared with the arrangements of FIGS. 1 and 2, there will be some loss of registration correcting information, but the horizontal correction required is unlikely to vary rapidly from line to line and this loss is, therefore, unlikely to matter in practice.

By using four ganged three-position switches and providing yet another delay-store of one line period following the unit DS2, the arrangement of FIG. 3 can be modified to secure registration in a four-tube camera of the Y, R, G, B type. In this modification a three position switch, corresponding to $S_1$, feeds the red, blue and green signals in turn to BP3 and of the three remaining position switches one (corresponding to $S_2$) feeds out dynamic shift signals from the output of the first of the three delay stores to the blue tube; the second (corresponding to $S_3$) feeds out dynamic shift signals from the output of the second of the three delay stores to the red tube; and the third (additional) switch feeds out dynamic shift signals from the output of the last of the three delay stores to the green tube. Clearly this modification will involve further loss of registration information (as compared with FIG. 2) since each color tube will receive registration correction only in every third line but, again, this is not considered likely to matter seriously in practice.

The embodiments so far described have the defect, which may be important in some cases that if, in operation, the images scanned lack detail for prolonged periods, the tubes may drift too far out of horizontal registration to be restored unambiguously to registration when detail is restored. Such prolonged lack of detail could occur because of the common practice of camera operators to defocus a camera when it is at "standby," in order to reduce the risk of image retention. This defect can be avoided by resorting to digital storage of the registration correcting information provided by or derived from the output of the comparator C.

Figure 4:
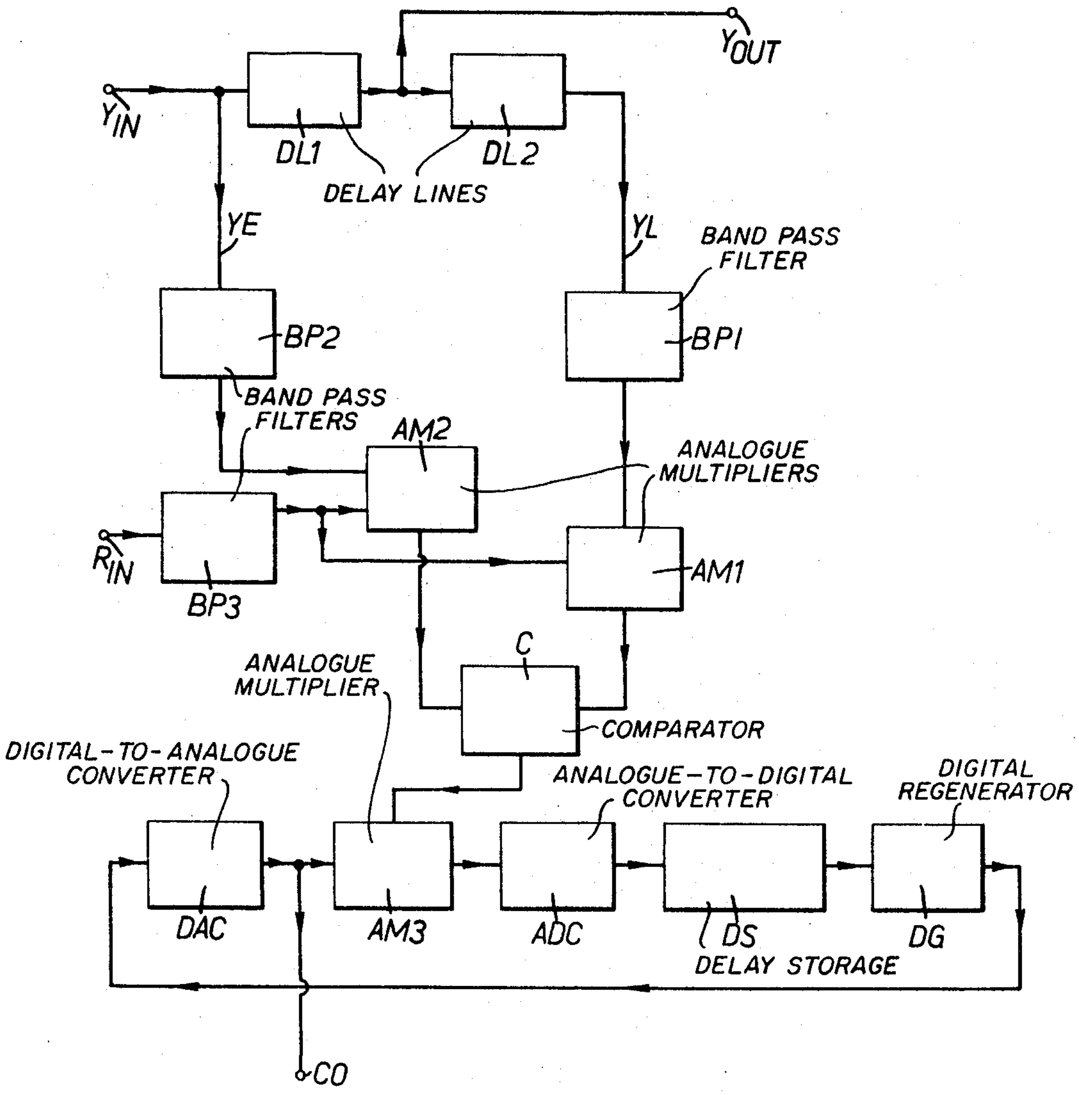

FIG. 4 shows an arrangement in which this expedient is applied to an embodiment which is otherwise as shown in FIG. 1, the digital storage being effected in the recirculating loop round the multiplier AM3. Referring to FIG. 4 an analogue-to-digital converter ADC is interposed between the multiplier AM3 and the one-line delay store DS and a digital regenerator DG followed by a digital-to-analogue converter DAG is interposed between DS and AM3, the dynamic shift output being taken to the tube to be brought into register from the output side of the last-mentioned unit DAC. The other units in FIG. 4 are as in FIG. 1 and are correspondingly referenced.

Figure 5:
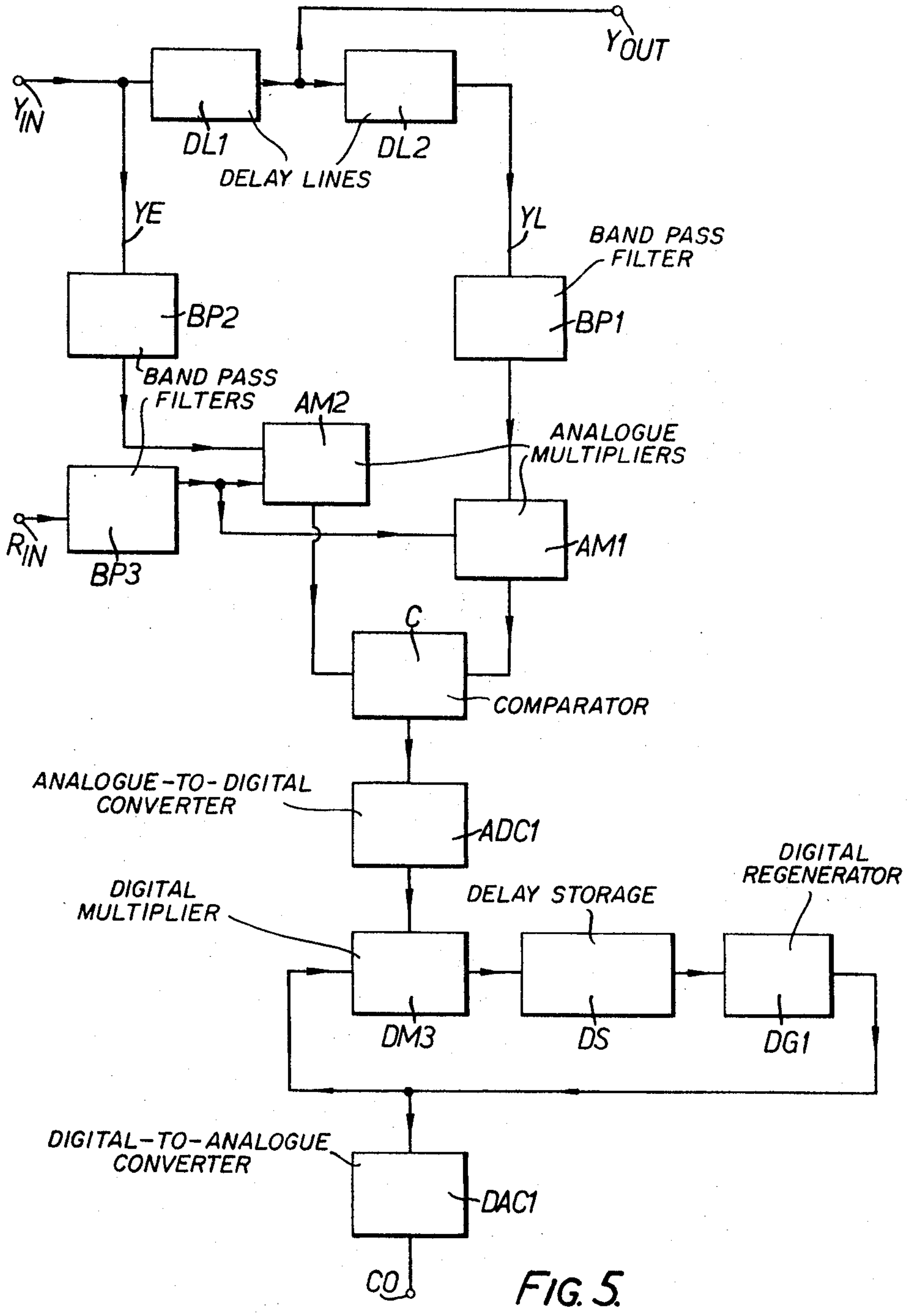

A modification of FIG. 4, also using digital storage, is shown in FIG. 5. Here an analogue-to-digital converter ADC1 is fed from the output of the comparator C and a digital multiplier DM3 is used in place of the multiplier AM3 of FIGS. 1 and 4. This feeds into the one-line delay store DS which is followed by a digital regenerator DG1 in the recirculating loop. The output from DG1 is taken to the output terminal CO through a digital-to-analogue converter DAC1.

Digital storage may, as will now be apparent, be similarly applied by the methods illustrated by FIGS. 4 and 5 to the other, previously described, embodiments of the invention. Where digital storage is employed it may be convenient to replace the delay line store or stores (e.g. DS in FIG. 1) by a digital storage device, e.g., a shift register or a store of the ferrite core type.

The embodiments so far illustrated achieve registration in the horizontal or line direction only. This may be sufficient for practical purposes in some cases but preferably the invention is also used to provide registration in the vertical direction as well. The principal difference between the problem of securing registration in the vertical direction and that of securing it in the horizontal direction is that, in the former case, the use of band pass filters (BP1 and BP2 in FIGS. 1 to 5) is, in practice, insufficient to produce the required two vertical detail signals. These signals, are therefore produced by comparing in an auxiliary comparator signals from the tube used as the reference tube (e.g. a luminance tube) with the same signals delayed by one line and by comparing, in another auxiliary comparator, the said delayed signals with the same signals delayed by a further line, the outputs from the two auxiliary comparators being used in the same way as are the outputs from the filters BP1 and BP2 in FIGS. 1 to 5 except, of course, that the delay of the delay store or stores (DS in FIG. 1, for example) is now made one field instead of one line.

Figure 6:
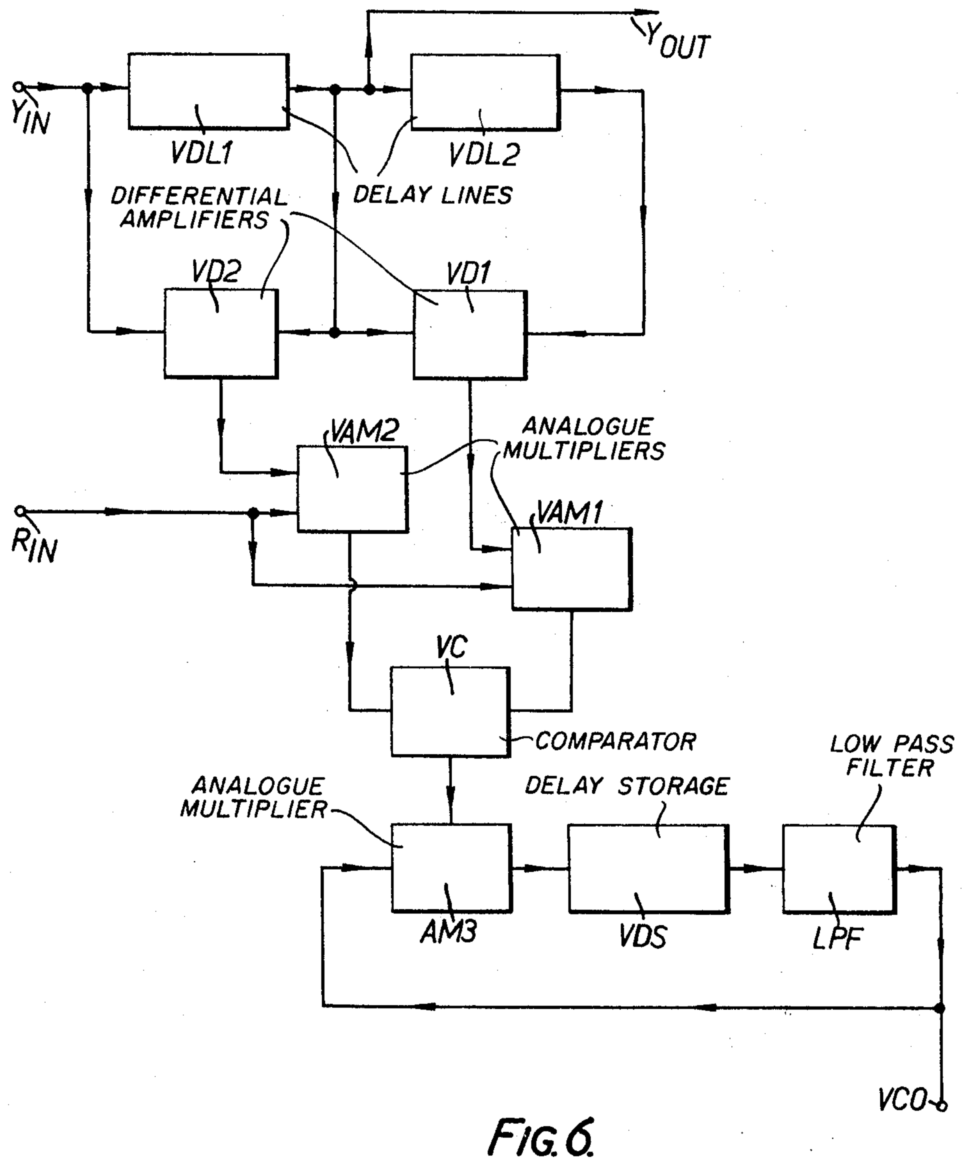

FIG. 6 shows a vertical registration correcting circuit which is of the same general nature as the horizontal registration correcting circuit of FIG. 1. The differences between FIGS. 1 and 6 are that the delay store, referenced VDS, has a delay of one field and a band width of about 5 to 10 times the field frequency; the delay devices VDL1 and VDL2 have each a delay of one line; and the band pass filters BP1 and BP2 are replaced by differential amplifiers VD1 and VD2 of which the former compares the signals at opposite ends of VDL2 and the latter compares the signals at opposite ends of VDL1. VAM1 and VAM2 are analogue multipliers performing functions similar to those of AM1 and AM2 in FIG. 1 and VC is a differential amplifier performing a function similar to that of C in FIG. 1. The registration correcting vertical dynamic shift waveform is taken off at the terminal marked VCO. The horizontal registration correcting arrangements shown in FIGS. 2 to 5 may similarly be modified to correct for registration in the vertical direction. As in the case of horizontal registration correction, and for the same reason, the use of digital storing is preferred when effecting vertical registration correction.

The horizontal registration correcting arrangements so far described are capable of correcting for truly horizontal errors, i.e. errors known by the descriptions "horizontal centering," "linearity" and "width," but not for errors in the vertical direction occurring along a horizontal line i.e. errors known by the descriptions "twist" and "dee." Similarly the vertical registration correcting arrangements so far referred to are not capable of correcting for variations in vertical registration from side to side or combinations of errors resulting in so-called "trapezium" or "Pincushion" distortion. Remaining uncorrected errors of the foregoing types may be conveniently termed "geometrical" errors.

Figure 7:
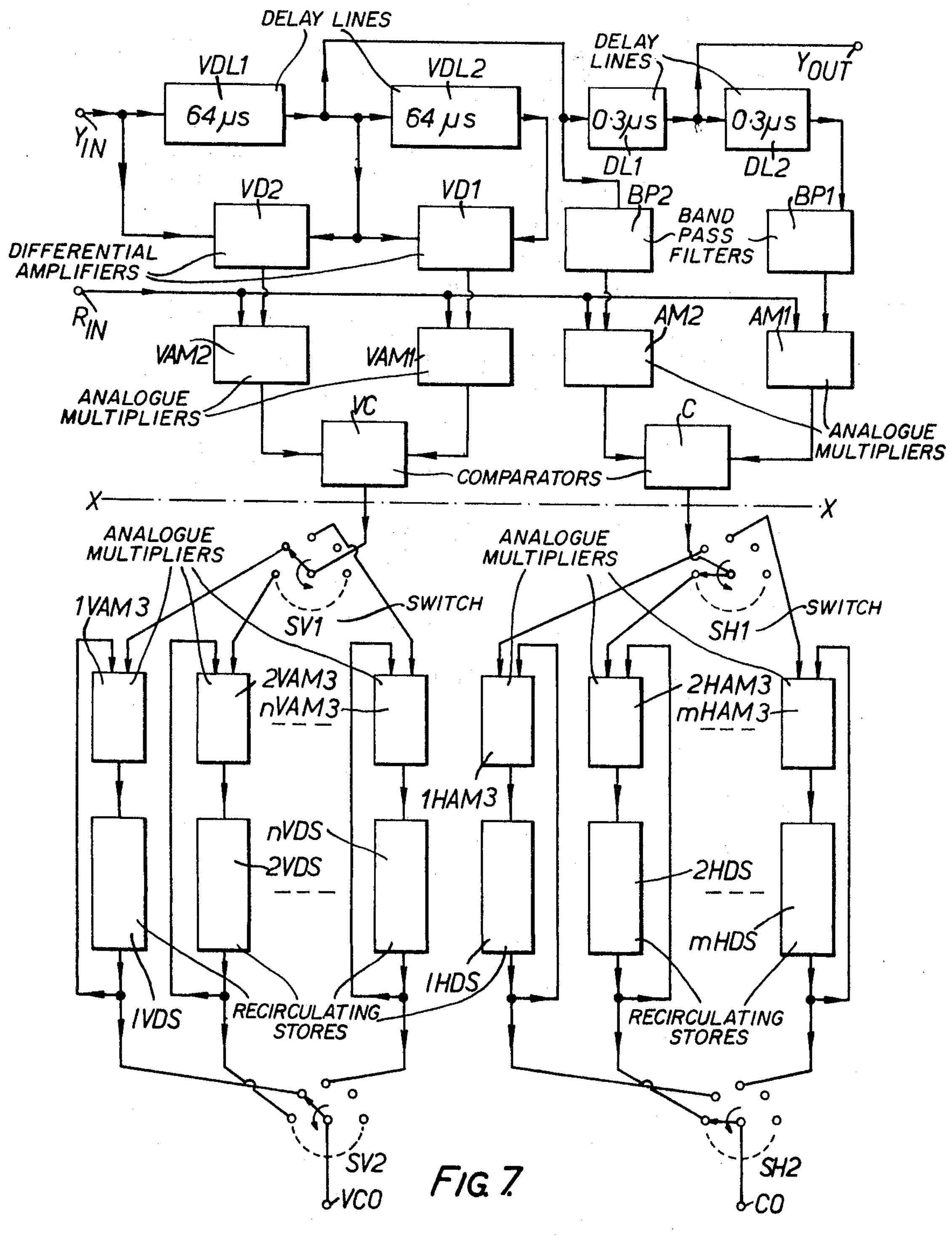

Geometrical errors are often negligibly small, or nearly so, and results which are acceptably good in many, if not most cases, can be obtained by the arrangements already described which ignore geometrical errors and leave them uncorrected. Correction of such errors is, however, possible in carrying out the invention, though at the cost of considerable added complexity of apparatus. FIG. 7 shows one embodiment in which correction of geometrical errors is also obtained.

FIG. 7 may conveniently be considered as divided into two parts respectively above and below the chain line X—X. As will be apparent the part above this line is a combination of the circuits of FIGS. 1 and 6 and the references used in this part correspond with those used in FIGS. 1 and 6. The differential amplifier VC provides at its output information as to vertical misregistration and the differential amplifier C provides at its output information as to horizontal misregistration, both as already described.

The outputs from VC and C are fed to two rotary distributor switches SV1 and SH1 respectively, which are rotated by means not shown at the line frequency and at the field frequency respectively, SV1 executing one complete rotation per line and SH1 executing one complete rotation per field. SV1 rotated in synchronism with i.e. is ganged with a second similar distributor switch SV2 and SH1 rotates synchronously with another similar distributor switch SH2. SV1 and SV2 have a plurality of contacts, the same number in each case. SH1 and SH2 also both have the same number of contacts.

The switch SV1 feeds the output from VC in turn to a number *in* of analogue multipliers (as many as there are contacts in the switch) 1VAM3, 2 VAM3,–*n*VAM3, each followed by a delay store 1VDS, 2VDS–*n*VDS which provides a delay of one field, is in recirculating connection as shown with the multiplier it follows and supplies its output to a different contact of the switch SV2. The vertical registration correcting dynamic shift is taken off to the tube to be kept in registration from the armature of switch SV2 at terminal VCO.

Similarly the switch SH1 feeds the output from C in turn to a number *m* of analogue multipliers (as many as there are contacts in the switch) 1HAM3, 2HAM3,–*m*HAM3 each followed by a delay store 1HDS, 2HDS–*m*HDS which provides a delay of one line, is in recirculating connection with the multiplier it follows and supplies its output to a different contact of the switch SH2. The horizontal registration correcting dynamic shift is taken off to the tube to be kept in registration from the armature of switch SH2 at terminal CO.

As will now be seen the arrangement of FIG. 6 in effect divides the images scanned into *m* rows and *n* columns and the recirculating stores 1HDS, 2HDS,–*m*HDS and 1VDS, 2VDS–*n*VDS are switched in accordance with the row and column being scanned at any time. In this way registration correction is obtained independently in each row and column and geometrical errors are therefore also corrected with a degree of accuracy dependent on the numbers of rows and columns. By the use of interpolation techniques known per se the corrections may be made to change smoothly instead of abruptly between switching positions.

Any of the embodiments illustrated may be modified by providing a pushbutton switch or switches which have to be closed in order to connect the comparator C or, where both horizontal and vertical registration corrections are provided both comparators C and VC from the following circuitry, the output of the said comparator or comparators being open circuited except when the button is pressed. When the said button is pressed the operation will be as already described with the stored registration correction waveforms in the store or stores (DS in FIG. 1 for example) continually "updated" by detail in the subject of transmission so that drifts away from correct registration due to temperature variations, stray external magnetic fields or other similar causes will be continuously corrected. The purpose of the provision of the pushbutton switching is to deal with a rather remote but possible risk is that certain types of subject may give rise to ambiguities which could lead to registration errors. Thus for example error-causing ambiguities could arise with a four-tube camera of the YGRB type or a three-tube camera of the YRB type if the picture were such that a luminance detail unaccompanied by a coloring detail (a luminance signal change unaccompanied by a color signal change) and a coloring detail unaccompanied by a luminance detail occurred separately but close together in time. Although it is believed that such an occurrence will be extremely rare it is a possibility. With the push button switching provided, the operator holds the button pressed while presenting to the camera a picture containing adequate and unambiguous detail e.g. a grating chart. With the button pressed the registration correction is effected as previously described herein. The operator keeps the button pressed until correct registration is obtained whereupon he releases the button and uses the camera in the ordinary way. The registration correction stored at the time the button is released will be "remembered" and used repeatedly without, however, being updated so that correction for drift will not occur after the button has been released. However the stored correction can be updated at any time by merely pressing the button at a time when the camera is viewing a picture of adequate and unambiguous detail.

I claim:

1. A color television camera of the component camera tube type having a plurality of component camera tubes comprising; means for receiving the output signals of each of the said component camera tubes; means for comparing continuously the changes in output signals of one component camera tube corresponding to successive picture elements in a given horizontal scan for at least a portion of that scan with changes in output signals from another component camera tube corresponding to the same said successive picture elements; means for producing a resultant of said comparison; and means for utilizing the resultant of the comparison to control, in dependence upon said resultant, the scanning in one of said tubes to correct for registration errors thereof with respect to the scanning in the other.

2. A camera as claimed in claim 1 wherein, in order to achieve correction for horizontal registration errors as between two component tubes, output signals from one of them are subjected successively to two equal delays each approximately equal to half a coloring channel picture element; the undelayed signals and the double delayed signals are fed respectively to two analogue multipliers the second inputs to which are constituted by the output signals from the other of said tubes; and the outputs from the two analogue multipliers are fed respectively to the two inputs of a comparator the output from which is utilized to control the horizontal scanning in said other component tube.

3. A camera as claimed in claim 2 wherein the undelayed and doubly delayed signals are fed to their respective analogue multipliers through similar band pass filters.

4. A camera as claimed in claim 2 wherein the output from the comparator is fed to one input of a third analogue multiplier the output from which is fed through means including a delay-store having a delay of one line period to the second input of said third analogue multiplier, the output from said store being utilized to provide horizontal dynamic shift voltage for said other control tube.

5. A camera as claimed in claim 2 wherein the output from the comparator is fed to one input of a third analogue multiplier the output from which is fed to an analogue-to-digital converter followed by a delay store having a delay of one line period and which is in turn followed by a digital regenerator in turn followed by a digital-to-analogue converter feeding back into the second input of said third analogue multiplier, the output from said digital-to-analogue converter being utilized to provide horizontal dynamic shift voltage for said other control tube.

6. A camera as claimed in claim 2 wherein the output from the comparator is fed via an analogue-to-digital converter to one input of a third multiplier constituted by a digital multiplier, the output from which is fed via a delay store having a delay of one line period and which is followed by a digital regenerator, back to the second input of said digital multiplier, the output of said digital regenerator being also fed to a digital-to-analogue converter the output from which is utilized to provide horizontal dynamic shift voltage to said other tube.

A camera as claimed in claim 2 wherein the output from the comparator is switched cyclically and in turn to a plurality of units each comprising a multiplier and a following delay store providing a delay of one line period and feeding back into the second input of the last-mentioned multiplier, the outputs of the stores in the different units being switched in synchronism with the aforesaid switching, cyclically and in turn to a circuit from which horizontal dynamic shift voltage is taken to said other tube, the switching being such that one complete cycle thereof is effected in one field period.

8. A camera as claimed in claim 1 wherein, in order to achieve correction for vertical registration errors, output signals from one component tube are subjected successively to two equal delays each substantially equal to one line; the undelayed and singly delayed signals are fed as the two inputs of a first auxiliary comparator; the singly delayed and doubly delayed signals are fed as the two inputs to a second auxiliary comparator; the outputs of the two auxiliary comparators are fed respectively to two analogue multipliers the second inputs to which are constituted by the output signals from the other of said tubes; and the outputs from the two analogue multipliers are fed respectively to the two inputs of a main comparator the output from which is utilized to control the vertical scanning in said other tube.

9. A camera as claimed in claim 8 wherein the output from the main comparator is fed to one input of a third analogue multiplier the output from which is fed through means including a delay-store having a delay of one field period to the second input of said third analogue multiplier.

10. A camera as claimed in claim 8 wherein the output from the main comparator is fed to one input of a third analogue multiplier the output from which is fed to an analogue-to-digital converter followed by a delay store having a delay of one field period an which is in turn followed by a digital regenerator in turn followed by a digital-to-analogue converter feeding back into the second input of said third analogue multiplier, the output from said digital-to-analogue converter being utilized to provide vertical dynamic shift voltage for said other control tube.

11. A camera as claimed in claim 8 wherein the output from the main comparator is fed via an analogue-to-digital converter to one input of a third multiplier constituted by a digital multiplier, the output from which is fed via a delay store having a delay of one field period which is followed by a digital regenerator, back to the second input of said digital multiplier, the output of said digital regenerator being also fed to a digital-to-analogue converter the output from which is utilized to provide vertical dynamic shift voltage to said other tube.

12. A camera as claimed in claim 8 wherein the output from the main comparator is switched cyclically and in turn to a plurality of units each comprising a multiplier and a following delay store providing a delay of one field period and feeding back into the second input of the last mentioned multiplier, the outputs of the stores in the different units being switched in synchronism with the aforesaid switching, cyclically and in turn to a circuit from which vertical dynamic shift voltage is taken to said other tube, the switching being such that one complete cycle thereof is effected in one line period.

13. A camera as claimed in claim 1 having at least three component camera tubes and provided with a plurality of separate comparators each connected to compare changes in the output signals from one tube with changes in the output signals from a different one of the remaining tubes; means for producing a plurality of resultants, one from each comparator and each of which is utilized to control scanning in a different one of said remaining tubes.

14. A camera as claimed in claim 1 having at least three component camera tubes and provided with a comparator having one input fed with output signals from one tube and another input which is switched to receive outputs from the remaining tubes one at a time and in turn so as to produce successively each of a plurality of resultants which are also switched successively to effect control of scanning in the different remaining tubes.

15. A camera as claimed in claim 14 wherein the control is of scanning in the horizontal direction and means are provided to effect the switching of an integral fraction of the line frequency.

16 . A camera as claimed in claim 14 having three component camera tubes and wherein means are provided to effect the switching at half the line frequency and the comparator has one input fed with output signals from one tube and its other input switched to receive outputs from the other two tubes one at a time and in turn.

17. A camera as claimed in claim 14 having four component camera tubes and wherein means are provided to effect the switching at one third of the line frequency and the comparator has one input fed with output signals from one tube and its other input switched to receive outputs from the other three tubes one at a time and in turn.

18. A camera as claimed in claim 1 wherein means are provided to effect registration by controlling horizontal scanning only so as to secure registration in the horizontal direction alone.

19. A camera as claimed in claim 1 wherein comparison means are provided for comparing changes in the output signals from one component tube with changes in the output signals from another to produce another resultant of comparison which is utilized to control, in dependence thereon, the vertical scanning in one tube to correct for vertical registration errors thereof with respect to vertical scanning in the other.

20. A camera as claimed in claim 1 wherein the resultant of each comparison is fed to a multiplier followed by a delay store the output of which is recirculated back to the multiplier and is also employed to provide a scanning control signal.

21. A camera as claimed in claim 13 wherein there are provided additional switch means, operable at will, inserted in the output circuit of each comparator comparing output signals from two different component camera tubes whereby said circuit or circuits may be at will held open or closed.

* * * * *